United States Patent [19]

Schreiner

[11] Patent Number: 5,617,461
[45] Date of Patent: Apr. 1, 1997

[54] METHOD FOR THE OPERATION OF A DIGITAL IMAGING SYSTEM OF AN X-RAY DIAGNOSTIC APPARATUS

[75] Inventor: Horst Schreiner, Fuerth, Germany

[73] Assignee: Siemens Aktiengesellschaft, Munich, Germany

[21] Appl. No.: 682,028

[22] Filed: Jul. 16, 1996

[30] Foreign Application Priority Data

Jul. 25, 1995 [DE] Germany ................ 195 27 148.3

[51] Int. Cl.⁶ .................................................. H05G 1/64
[52] U.S. Cl. ........................... 378/98.5; 378/98.12
[58] Field of Search ................ 378/98, 98.2, 98.3, 378/98.4, 98.5, 98.7, 98.8, 98.11, 98.12, 901, 4

[56] References Cited

U.S. PATENT DOCUMENTS

| | | | |
|---|---|---|---|
| 4,752,944 | 6/1988 | Conrads et al. | 378/98.2 |
| 5,047,861 | 9/1991 | Houchi et al. | 378/28 |
| 5,438,604 | 8/1995 | Horbaschek | 378/98.2 |
| 5,550,888 | 8/1996 | Neitzel et al. | 378/98.7 |

FOREIGN PATENT DOCUMENTS

0393763A1  10/1990  European Pat. Off. .
2243045    10/1991  United Kingdom .

*Primary Examiner*—Don Wong
*Attorney, Agent, or Firm*—Hill, Steadman & Simpson

[57] ABSTRACT

In a method for the operation of a digital imaging system of an X-ray diagnostic apparatus having an X-ray unit for the generation of X-ray images, an X-ray image converter-television chain for the acquisition of the X-ray images, the chain including a digital image converter having image points arranged in matrix form in rows and columns and a monitor for the reproduction of the X-ray images processed by the digital imaging system. Defective image points are recognized by converting at least one calibration image into a filter image by highpass filtering, e.g. a median filtering, and the filter image is subjected to defect determination, so that a defect image is obtained. The defect image is used for the correction of an original image.

16 Claims, 3 Drawing Sheets

METHOD FOR THE OPERATION OF A DIGITAL IMAGING SYSTEM OF AN X-RAY DIAGNOSTIC APPARATUS

BACKGROUND OF THE INVENTION

1. Field of the Invention

The present invention is directed to a method for the operation of a digital imaging system of an X-ray diagnostic apparatus, of the type having an X-ray unit for the production of X-rays, an X-ray image converter/television chain for the acquisition of the X-ray images, the chain including a digital image converter having image points arranged in matrix form in rows and columns and a monitor for the reproduction of the X-ray images processed by the digital imaging system.

2. Description of the Prior Art

In medical technology, digital imaging systems, in which digital image converters replace the previously employed analog image converters, are becoming increasingly important. Image converters of this sort that are used, e.g. amorphous silicon detectors, in general still cannot be produced without flaws. Alongside defective pixels or image points, failures of clusters, lines and columns also occur. Thus, for example, column failures are caused by interruptions in the address lines.

In order to limit the rejection of detectors, the defective image points can be corrected. For a successful correction, it is necessary to know which pixels are defective and which are good.

Previously, several dark images (images without radiation) and several sets of bright images, i.e. objectless images with radiation, were obtained with different intensities, and a dark current-corrected image was produced through an arithmetic combination. It was then attempted to find the defective pixels from these images. This could, for example, take place using histograms and predetermined threshold values in the histogram curve, or using a sum of histograms for different regions of the image, or by checking of all the image points of the image with certain range limits.

All these methods, or similar ones, however lead to problems if, for example, the electronic characteristics of the system change with a new detector or other modes of operation of the detector, since they primarily depend on a plurality of parameters that must first be determined for a particular detector unit.

In a copending application, a method for defect recognition in an amorphous silicon panel is described, in which, for the recognition of defective image points, a recursive lowpass filtering according to the principle of fuzzy masking, with separation of the defects according to rows and columns, is multiply applied to two images, of which a first image is produced with X-ray radiation without an object, and a second image is produced without X-ray radiation.

SUMMARY OF THE INVENTION

An object of the present invention is to provide a method of the type initially described above that enables a pixel-precise, certain recognition of defective image points in a simple way.

This object is inventively achieved in a method for the recognition of defective image points wherein at least one calibration image is converted into a filter image by means of a filtering, the filter image being subjected to a defect determination procedure, so that a defect image is obtained, which is used for the correction of the original image.

According to the invention, the filtering can be highpass filtering, e.g. a two-dimensional median filtering, in which filtering first can take place one-dimensionally in a first direction, and then one-dimensionally in a second direction perpendicular to the first.

According to the invention, a determination of the defects can ensue by the calculation of the histogram distribution.

It has proven advantageous to use the following procedural steps:

a) highpass filtering of a calibration image, b) determination of the histogram core, and c) calculation of the defects of the image points outside the histogram core.

As an alternative, for the highpass filtering a lowpass filtering of the calibration image can be carried out, and the filter image obtained in this way can be subtracted from the calibration image.

A particularly simple and rapid method is obtained in an embodiment wherein the calibration image is subjected to a correction of defects that have already been found, the correction image is converted into a filter image by means of a lowpass filtering, the filter image being subtracted from the calibration image, and the difference image thus obtained is supplied to a threshold comparison for the determination of defects, so that a defect image is obtained that is used for the correction of the calibration image.

It has proven advantageous for the threshold for the threshold comparison to be calculated by the determination of the histogram distribution of the difference image. According to the invention, the lowpass filtering can be carried out according to the principle of unsharp masking.

It has proven advantageous to use the following procedural steps:

a) correction in the original image of defects already found, b) lowpass filtering of the corrected image, c) formation of the difference of the original image and the image with lowpass filtering, d) checking of this difference for new defects, and e) repetition of the process if new defects were found.

As calibration images, according to the invention a bright image and a dark image, a noise image and a signal image, can be used, whereby the calibration images can consist of a series of successive calibration images.

An exact determination of further calibration signals can ensue if the recognition of defective image points is also carried out in a reference zone.

An image converter made of amorphous silicon (aSi) or an X-ray image amplifier with a coupled CCD image converter is an example of an X-ray image converter with defective image points, which can be identified according to the invention.

DESCRIPTION OF THE PREFERRED EMBODIMENTS

Figure 1:
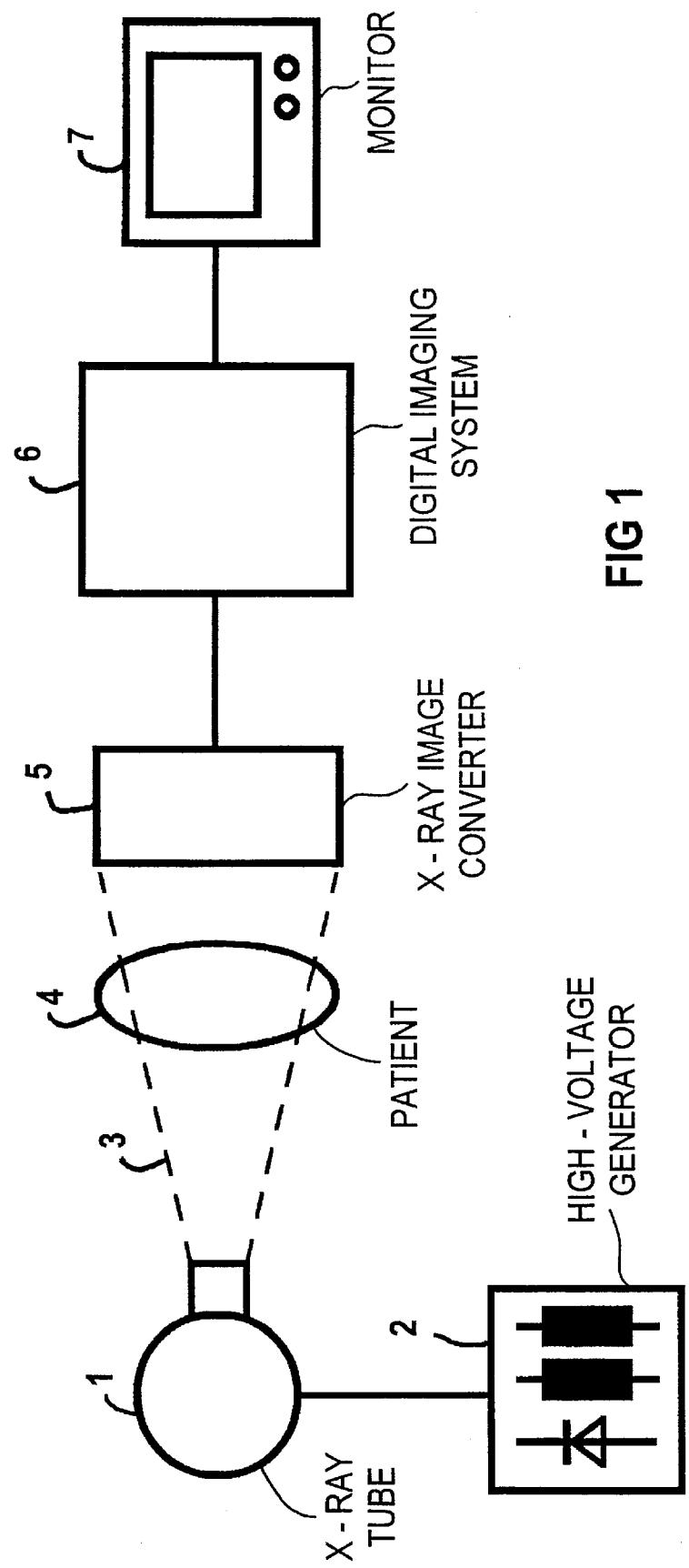
FIG. 1 is a block diagram of an X-ray diagnostic apparatus according to the prior art, but including a digital imaging system for the application of the inventive method.

FIG. 1 shows a known X-ray diagnostic apparatus (except for the inventive digital imaging system) having an X-ray tube 1 driven by a high-voltage generator 2. The X-ray tube 1 emits an X-ray beam 3, which penetrates a patient 4 and falls on an X-ray image converter 5 as an X-ray image, attenuated according to the transparency of the patient 4. The X-ray image converter 5 is connected to a digital imaging system 6 and a monitor 7 attached thereto for the reproduction of the X-ray image. The digital imaging system 6 can include a processing circuit, a converter, difference levels and an image memory in a known way.

In an X-ray diagnostic apparatus of this type, the X-ray image converter 5 can be a photodiode matrix or one or several CCD image sensors that are coupled with an X-ray image amplifier, or a scintillator layer made of a phosphor that is sensitive to X-rays. The X-ray image converter 5 can consist of hydrogenated amorphous silicon (aSi:H).

In image converters of this type, several image points of the image matrix can be defective. Individual image points, several rows and/or columns of overlapping groups of image points (clusters), or entire rows or columns may be defective.

It must first be defined as to what are defective image points. To answer this, the "normal" behavior, of the pixels must be defined. Non-uniformities in the radiation through the X-ray tube 1, or of the scintillator, are normally present only in low spatial frequencies of the calibration image. Furthermore, the noise portions in the calibration image are undesired and can be left out of consideration. The first approach would thus be to define as normal the unsharp mask determined with a kernel that is not too small, having e.g. a kernel size of 31×31, as a rectangular filter of the calibration image. Unfortunately, due to the averaging, the defects are thereby smeared, on their surroundings, thus also influencing adjacent pixels.

A median filter is better suited for this case, however, this has a fairly high computing time associated therewith, especially for larger kernels. This can be partly reduced by dividing the two-dimensional filter into two one-dimensional filterings, carried out separately one after the other in the row and column directions. The difference in relation to the true two-dimensional filter is small, and is negligible for this purpose.

Figure 2:
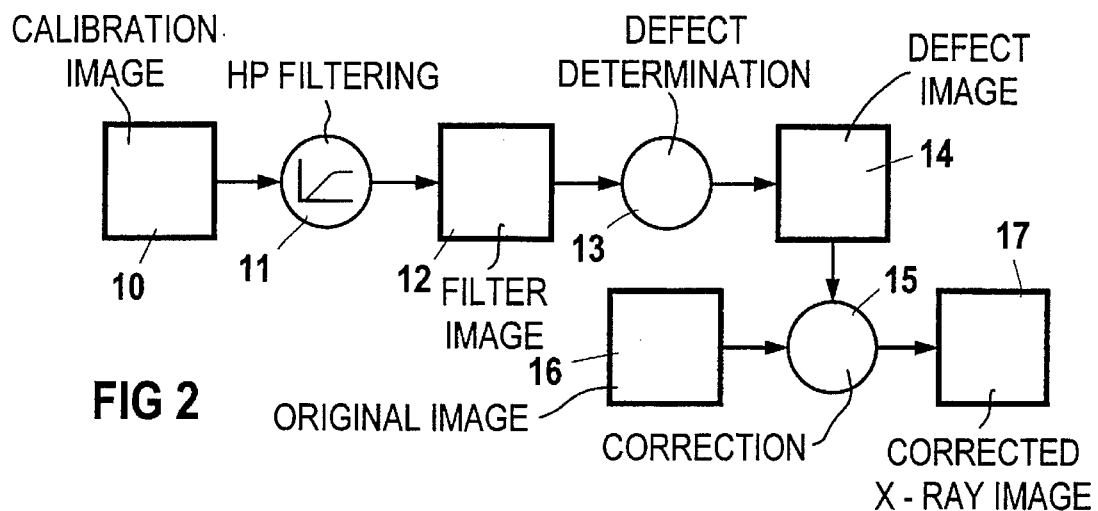
FIG. 2 shows the general steps of the inventive method.

In FIG. 2, the general inventive method is represented. A calibration image 10 is subjected to a highpass filtering 11. The resulting filter image 12 is supplied to a defect determination procedure 13, which yields as a result a defect image 14 that identifies the collected defective image points. With this defect image 14, a correction 15 of an original image 16 with X-ray radiation can ensue, so that a corrected X-ray image 17 is obtained. The correction 15 can be carried out, for example, by replacing the defective image points with a linear interpolation of adjacent image points.

Figure 3:
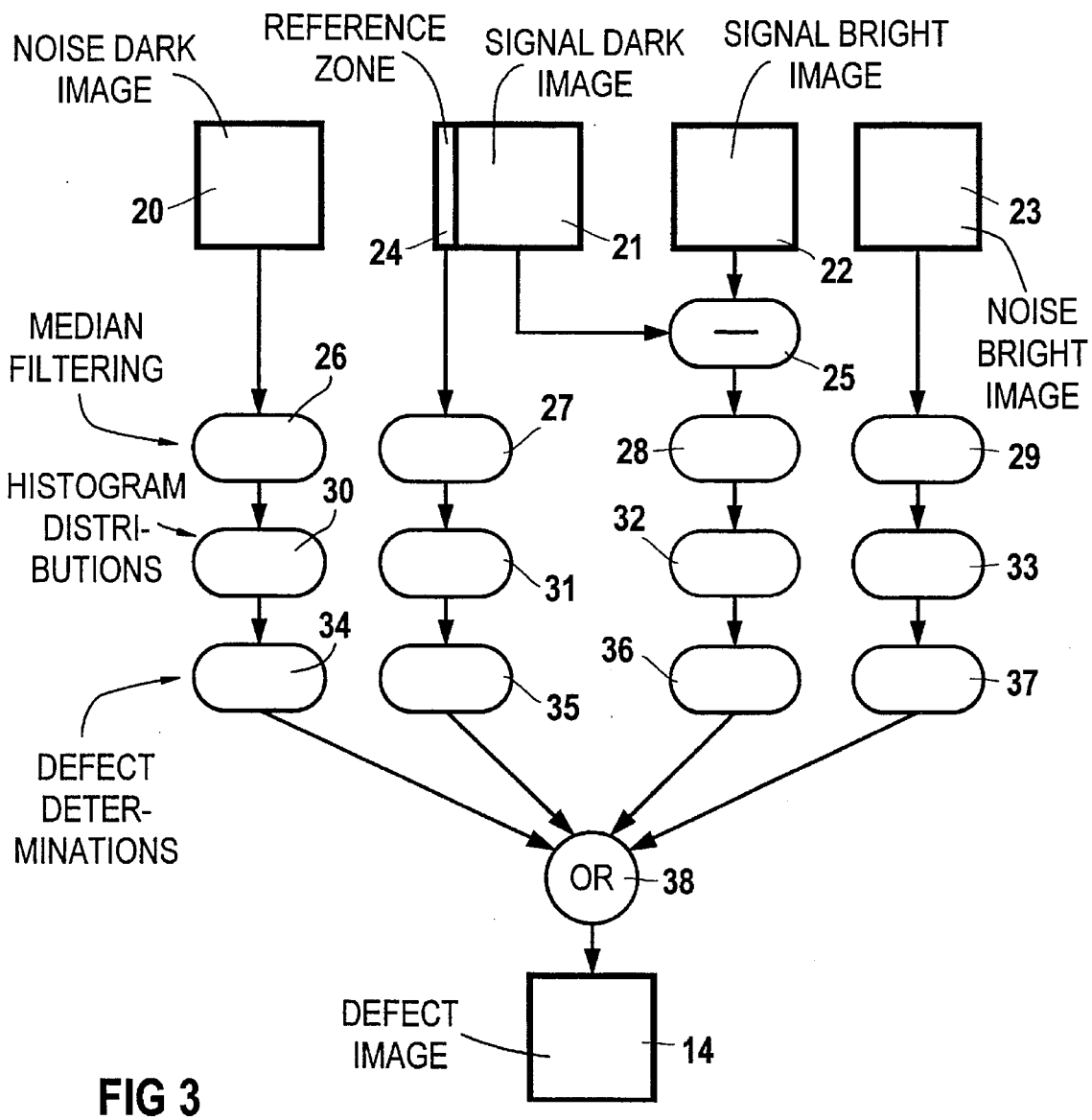
FIG. 3 shows a first embodiment of the inventive method.

FIG. 3 shows a first embodiment of the inventive method in more detail. Four different images are used as calibration images 10: a noise dark image 20, a signal dark image 21, a signal bright image 22 and a noise bright image 23. "Dark image" means an image or a series of images without any exposure, and a "bright image" is an image or a series of images with uniform exposure without an examination subject in the beam. As the noise image, the scatter or variance $\sigma^2$ is evaluated for each pixel of an image series, and for the signal images the average value of a series of images is likewise evaluated respectively for each pixel. A signal of a dark image of the reference zone 24 is also correspondingly acquired.

The dark reference zone of the amorphous silicon detector being used at the left edge of the image, the beginning of the rows, requires a particular treatment. It is covered so as to be light- and radiation-proof, so that no additional signal arises even in the bright image. It serves to reduce the row noise and to correct small transients in the offset. Here as well, defects must be recognized, so that these do not falsify the row correction. The (dark current) offset alone must serve as a criterion relating to the signal. The defect limits here can be set even somewhat more narrowly, since some additional defects do not impair the image information, but, on the other hand, unrecognized defects would ruin the reduction of the row noise. Rows having too few good pixels are declared defective as a whole.

The two noise images 20 and 23, the signal image of the reference zone 24 and the difference 25 of the signal images 21 and 22, are subjected to a two-dimensional highpass filtering, i.e. a median filtering in respective filters 26 to 29. In a median filtering of this type, in contrast to the simple rectangular filter surrounding an image point, the average value is not formed, but rather, after all the values found in the surrounding area have been sorted, the value lying in the middle is designated as the filter value. Individual values lying far from the average value, which are probably defects, thus have practically no influence on the filter value. Thus, as described, the filter has a lowpass character. The highpass character is obtained by simple subtraction of the output value from the original value.

Respective histogram distributions 30 to 33 are determined from the respective filter values, and subsequently respective defect determinations 34 to 37 is carried out from the histograms 30 to 33. This ensues in such a way that the core of each of the histogram distributions 30 to 33 is determined, i.e. the region extending around the maximum of the Gaussian-like curves. The defective image points lying outside this region are determined by simple expansion of this region by a factor.

The respective output signals of the defect determinations 34 to 37 are supplied to an OR connection 38, whose output forms the defect image 14.

Figure 4:
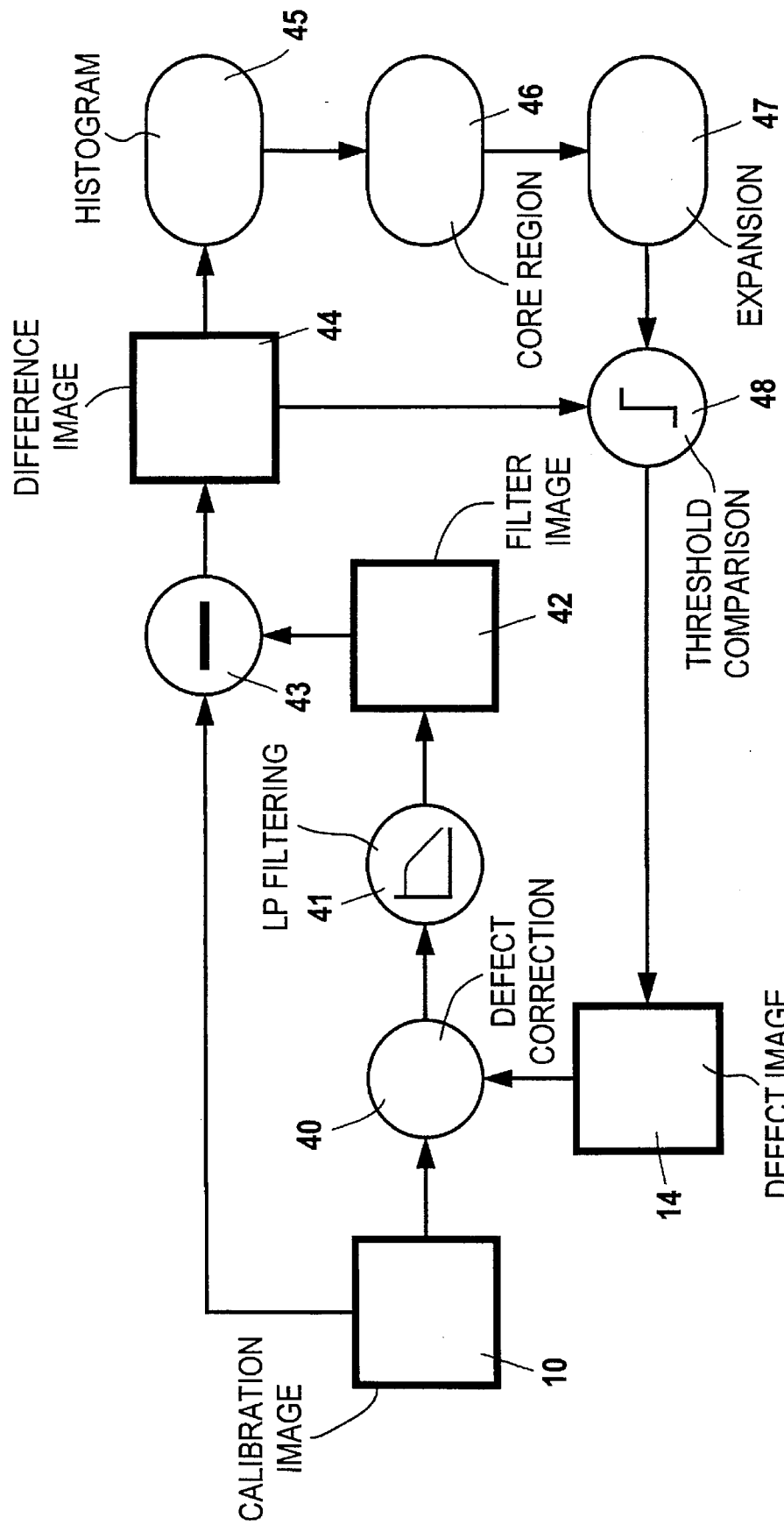
FIG. 4 shows an alternative embodiment of the inventive method.

An alternative version of the inventive method is shown in FIG. 4, distinguished in particular by low computing expense. The median filtering is here replaced by an iteration that uses the rectangular filter. Otherwise, the processing steps remain the same. The calibration image 10, the respective signal or noise images 20 to 24, are subjected to a defect correction 40, in which already-recognized defective image points are corrected, for example, by a linear interpolation. After lowpass filtering 41 with a rectangular filter, the filter image 42 is subjected to a subtraction 43 with the calibration image 10. By means of this lowpass filtering 41 and subsequent subtraction 43, a filtered signal is obtained, in a similar way as through the highpass filtering 11. By means of a threshold comparison 48, new defects are found in the difference image 44, and are entered into the defect image 14. This process is multiply repeated.

The lowpass filtering 41 is carried out by a rectangular filter having a kernel that is not too small, the rectangular filter forming an arithmetic average value around an image point.

For setting the threshold, the histogram 45 is determined from the difference image 44, from which histogram the core region 46 is determined. The expansion 47 of the region by a factor then determines the height of the threshold for the threshold comparison 48 of the defective image points.

This iteration for the determination of the defective image points requires smaller computing times in relation to the median filtering, however, the advantage of the median filtering is that the desired defect image is obtained in one step.

The computing times of the median filtering can be accelerated through the following measures.

In the original median filtering, the core around each pixel must be sorted, i.e. in the case of a 30×30 core in a 1000×1000 image, a field of 900 values must be sorted $10^6$ times, so that all together 900×$10^6$ sorting values result.

If, however, the median filtering is divided according to x and y and a median filtering is formed twice in succession, by filtering once with a core of 30×1 and then filtering this result with a core of 1×30, only 2×$10^6$ fields of 30 values are to be sorted, so that 60×$10^6$ sorting values result, so that 15 times fewer sorting values result as previously.

If it is nonetheless desired to operate with unsharp masking, due to the faster computability, the influence of the defects on their surroundings must be reduced. This is inventively solved by the following iteration:

a) correction in the calibration image of the defects already found, e.g. using linear interpolation e.g. with simple thresholds, which have a signal near the range boundaries of the A/D converter, since the calibration images are normally taken well within these boundaries, b) lowpass filtering of the corrected image, c) formation of the difference of the original calibration image and the lowpass-filtered, corrected image, d) determination of thresholds for defects from the histogram of the difference, whereby defects already found in the histogram are left out of account, e) finding of new defects and addition of them to the ones already found, and f) repetition of the iteration until hardly any new defects are found.

In the context of finding the threshold value, it can, for example, be assumed that the core region of the histogram in a normal distribution containing 50% of all pixels corresponds to 0.675 times the standard deviation. Given an expansion of this region by e.g. a factor of 7, in a normal distribution only 3×10–5 of all values remain to be found outside. Pixels that nonetheless remain to be found outside have a high probability of being defective.

Through the iteration, the histogram approximates the normal distribution, since more and more already-found defects are excluded and are no longer taken into account in the histogram.

The advantage of this method lies in the automatic adaptation of the thresholds to the normal noise values of the pixels, which values are present in the calibration image.

The method is inventively used for calibration in an amorphous silicon detector. A detector of this type can for example comprise a matrix of 1024 rows and 1080 columns. The reference zone can consist of the image points nos. 0 to 79, whereby for example nos. 1 to 64 thereof are used, and at least 16 should not be defective. The A/D converter can have a resolution of 12 bits.

For calibration, one series of dark images and one series of bright images are always obtained. The following steps are used.

All images are examined, maintaining the boundaries of the A/D converter. Since in obtaining the calibration images it must be ensured that the digitization range of the A/D converter is not exceeded, pixels that nonetheless constitute a signal close to the boundaries of the A/D converter are certainly defective. Theses defects are a good starting point for the above-described iteration.

The images of each series are averaged, and the noise in the pixels is calculated. The four resulting images are supplied to the above-described defect recognition. For short calibration series, the noise can be averaged row by row and column by column.

The defect recognition is based on the offset values only in the reference zone, since through the covering no other signal can be generated. Defects are recognized by means of the above-described median filtering or iteration. Rows having too many defects in the reference zone are eliminated. A few pixels erroneously recognized as defective are not so serious here. This is not the case in the actual image, where as much information as possible should remain acquired.

All four images can be examined for defects using the method described above, however, it is better to examine only the difference between the bright and dark image in the signal, since the (dark current) offset alone is not a good defect criterion, since it can later be corrected easily during exposure.

The examination of the noise values has proven to be the most important step in defect recognition, since in image sequences pixels which are very noisy or blinking or even flickering rows and columns, enormously disturb the impression made by the image. In the signal, these are not necessarily conspicuous, since a normal average value can arise throughout. Even a defect recognition essentially based only on the noise values shows very good results.

For short series, the statistics concerning the noise values can be fairly poor. The conventional way to improve a statistically lean data set is to average over determined pixel groups up to rows and columns, however, in this way individual defects can no longer be recognized. On the other hand, if averaging is done over rows or columns, it is still possible to operate one-dimensionally, so that the median filter is again usable.

In contrast to known methods, which were primarily based on the signal values, with the inventive method considerably fewer image points are unnecessarily recognized as defective, and the impression made by the image is improved significantly. The latter is probably to be attributed to the additional noise examination.

The detector is operated in several modes of different sensitivity, which also influences the noise of the pixels. Nonetheless, the method has proven not to be sensitive to this, since all the thresholds are calculated automatically, or, are set relative to calculated values.

All the described steps of the method can also be carried out as a hardware solution, instead of as software controlling the imaging system 6.

The recognition and correction of defective image points can be implemented efficiently in hardware or can be executed by a multi-processor system, whereby here the individual processors can be optimally used.

Although modifications and changes may be suggested by those skilled in the art, it is the intention of the inventors to embody within the patent warranted hereon all changes and modifications as reasonably and properly come within the scope of their contribution to the art.

I claim as my invention:

1. A method for operating a digital imaging system in an x-ray diagnostic apparatus having an x-ray unit for generating x-ray images, an x-ray image converter video chain for converting the x-ray images into video images, the chain including a digital image converter having image points arranged in matrix form in rows and columns, and a monitor for displaying the video images, said method comprising the steps, for recognizing defective image points, of:

generating at least one calibration image;

converting said calibration image into a filter image by filtering said calibration image;

subjecting said filter image to a defect determination procedure and thereby obtaining a defect image; and correcting an original image using said defect image.

2. A method as claimed in claim 1 wherein the step of filtering said at least one calibration image comprises high pass filtering said at least one calibration image using a median filter.

3. A method as claimed in claim 2 wherein the step of high pass filtering said at least one calibration image using a median filter comprises two-dimensionally median filtering said at least one calibration image by first one-dimensionally filtering said at least one calibration image in a first direction, and secondly one-dimensionally filtering said at least one calibration image in a second direction perpendicular to said first direction.

4. A method as claimed in claim 1 wherein the step of subjecting said filter image to a defect determination procedure comprises calculating a histogram distribution of said filter image.

5. A method as claimed in claim 4 wherein the step of filtering at least one calibration image comprises highpass filtering at least one calibration image, wherein the step of calculating said histogram distribution of said filter image comprises determining a histogram core of said filter image, and wherein the step of correcting said original image comprises calculating defects of image points of said original image outside of said histogram core.

6. A method as claimed in claim 1 wherein the step of filtering at least one calibration image comprises low pass filtering said at least one calibration image to obtain a low pass filtered calibration image, and subtracting said low pass filtered calibration image from said calibration image to obtain said filter image.

7. A method as claimed in claim 6 comprising the additional step of correcting previously-found defects in said calibration image to form a correction image and using said correction image as said at least one calibration image in the filtering of said at least one calibration image, and subjecting said filter image to a threshold comparison for identification of defects therein to obtain said defect image.

8. A method as claimed in claim 7 comprising the additional step of calculating a threshold for said threshold comparison from a histogram distribution of said filter image.

9. A method as claimed in claim 6 wherein the step of low pass filtering said at least one calibration image comprises low pass filtering said at least one calibration image using unsharp masking.

10. A method as claimed in claim 6 comprising the additional step of correcting previously-identified defects in said original image to obtain a corrected image and using said corrected image as said calibration image in the step of filtering said calibration image, and wherein the step of filtering said calibration image comprises low pass filtering said corrected image to obtain a low pass filtered image and forming a difference image which is a difference between said original image and said low pass filtered image, using said difference image as said filtered image in the step of subjecting said filter image to a defect determination, and repeating the above steps if new defects are found in said difference image.

11. A method as claimed in claim 1 wherein the step of forming at least one calibration image comprises forming a bright image and a dark image.

12. A method as claimed in claim 1 wherein the step of forming at least one calibration image comprises forming a noise image and a signal image.

13. A method as claimed in claim 1 wherein the step of forming at least one calibration image comprises forming a series of successive calibration images.

14. A method as claimed in claim 1 wherein the step of subjecting said filter image to a defect determination comprises identifying defective image points in said filter image within a reference zone.

15. A method as claimed in claim 1 comprising the step of generating said original image with an x-ray image converter composed of amorphous silicon.

16. A method as claimed in claim 1 comprising the step of generating said original image with an x-ray image amplifier coupled to a CCD image converter.

* * * * *